(12) United States Patent
Nispel et al.

(10) Patent No.: US 10,822,668 B2
(45) Date of Patent: Nov. 3, 2020

(54) PROCESS FOR DEPHOSPHORIZATION OF MOLTEN METAL DURING A REFINING PROCESS

(71) Applicant: S.A. Lhoist Recherche et Developpement, Ottignier-Louvain-la-Neuve (BE)

(72) Inventors: Michael Nispel, Uccle (BE); Guillaume Criniere, Braine-l'Alleud (BE); Eric Perrin, Paris (FR); Thierry Chopin, Brussels (BE); Jose Noldin, Waterloo (BE)

(73) Assignee: S.A. Lhoist Recherche et Developpement, Ottignies-Louvain-la- (BE)

( * ) Notice: Subject to any disclaimer, the term of this patent is extended or adjusted under 35 U.S.C. 154(b) by 304 days.

(21) Appl. No.: 15/541,789

(22) PCT Filed: Jan. 8, 2016

(86) PCT No.: PCT/EP2016/050289
§ 371 (c)(1),
(2) Date: Jul. 6, 2017

(87) PCT Pub. No.: WO2016/110574
PCT Pub. Date: Jul. 14, 2016

(65) Prior Publication Data
US 2017/0349959 A1    Dec. 7, 2017

(30) Foreign Application Priority Data

Jan. 9, 2015  (EP) .................................... 15150704

(51) Int. Cl.
*C21C 1/02*     (2006.01)
*C21C 7/064*    (2006.01)

(52) U.S. Cl.
CPC ................ *C21C 1/025* (2013.01); *C21C 1/02* (2013.01); *C21C 7/064* (2013.01); *C21C 7/0645* (2013.01)

(58) Field of Classification Search
CPC ......... C21C 1/02; C21C 1/025; C21C 7/0645; C21C 7/064; C22B 1/2406; C22B 1/24
See application file for complete search history.

(56) References Cited

U.S. PATENT DOCUMENTS

| | | |
|---|---|---|
| 4,263,043 A | 4/1981 | Haida et al. |
| 4,356,032 A | 10/1982 | Morishita et al. |
| 2015/0027656 A1* | 1/2015 | Tang ....................... C21C 1/025 164/473 |

FOREIGN PATENT DOCUMENTS

| | | |
|---|---|---|
| DE | 102009034700 A1 | 4/2010 |
| JP | 2002309312 A | 10/2002 |
| JP | 2013087350 A | 5/2013 |
| KR | 1020120132909 | 12/2012 |
| WO | 2014009510 A1 | 1/2014 |

OTHER PUBLICATIONS

Jalkanen, Heikki and Lauri Holappa. "Converter Steelmaking." Chapter 1.4. Treatise on Process Metallurgy, vol. 3. pp. 223-270. http://dx.doi.org/10.1016/B978-0-08-096988-6.00014-6 (Year: 2014).*
Krasnyanskaya, I. A; "Experimental Investigation of Phosphorus Behaviour in CaO—SiO2—MgO=Al2O3—P2O5 Oxide System"; National University of Science and Technology"MISIS"; Moscow, Russia; Feb. 20, 2014; 7 pages English Translation—Abstract Only.
International Search Report; PCT/EP2016/050289; dated Jan. 29, 2016; 3 pages.
Komarek, Richard, "Roll-Press Briquetting Can Help Lime Producers Improve Materials Handling", Article, Mining Engineering, Dec. 1993, 3 pages.
Prabhulingaiah, et al., "Resistance of Limestone to Size Reduction", Article, Indian Chemical Engineer, copyright 2007, Indian Institute of Chemical Engineers, vol. 49 No. 2, Apr.-Jun. 2007, pp. 143-150.
Scheel, R., technische forschung staihl, Entwicklung Eines Verfahrens Zur Entsilizierung Und Entphosphorung Von Rhoeisen, Kommission der Europaischen Gemeinschaften, Article, Forschunosvertrag Nr. 7210-CB/105 (1.1.1985-31.12.1987) 1989, 154 pages p. 28 Attached in English.
Von Beergassessor Eberhart Schiele Und Dr.-Ing Leo W. Berens, Kalk, Herstelling-Eigenschaften-Verwendung, Mil 345-Bliern und 115 Tafein, Article, 1972, Verlag Stahleisen M.B.H./Dusseldorf, 41 pages.
Von Beergassessor Eberhart Schiele Und Dr.-Ing Leo W. Berens—Attached in English p. 246—item 5.2.1.4; p. 282—Table 64; p.283 second and fifth paragraphs; p. 289—item 6.2.2.2.2; p. 290—Figure 194; p. 291—item 6.2.3.1.2.; p. 293—item 6.2.3.1.3.; p. 294—Figure 196; p. 323—item 6.2.4.3 (alinea 1 + portion of alinea 2); p. 331—Table 66; p. 337—item 6.2.4.3.4; p. 344—§ after figure 240; p. 346—item 6.2.4.4; p. 348—First 5 §; p. 350—Third §; p. 352—item 6.2.5.3; p. 353—First §.

* cited by examiner

Primary Examiner — Tima M. McGuthry-Banks
(74) Attorney, Agent, or Firm — Whitaker Chalk Swindle & Schwartz PLLC; Charles Gunter

(57) ABSTRACT

Process for dephosphorization of molten metal during a refining process using a lime composition in the form of compacted particles having a Shatter Test Index of less than 20%, leading to a refined metal reduced in phosphorus components to the extent that the refined metal reduced in phosphorus is showing a phosphorus content lower than 0.02 w % based on the total weight of the refined metal reduced in phosphorus.

17 Claims, No Drawings

PROCESS FOR DEPHOSPHORIZATION OF MOLTEN METAL DURING A REFINING PROCESS

The present invention relates to a process for dephosphorization of molten metal during a refining process comprising the steps of
- charging a vessel with hot metal and optionally scrap
- charging said vessel with a first lime composition
- blowing oxygen into said vessel
- forming slag with said first lime composition charged into said vessel
- dephosphorization of hot metal to form a refined metal reduced in phosphorus components, and
- discharging said refined metal reduced in phosphorus components.

In nature, metals are found in impure states called ores, often oxidized and mixed in with silicates of other metals. To extract the metal from the ores, different processes exist such as physical purification steps, hydrometallurgy, pyro metallurgy, lixiviation and electrometallurgy.

The present invention merely relates to conversion process, following smelting process during which the ore is exposed to high temperatures to form hot metal. During smelting, a part of the impurities contained in the ore are already separated from the molten metal.

To produce refined metal, EAF (Electric Arc Furnaces) or EOF (Energy Optimizing Furnaces) or converters such as BOF (Basic Oxygen Furnaces) or AOD (Argon Oxygen Decarburization) converters in which oxygen gas is blown to burn carbon, silicon and phosphorus are used. Nowadays, the most commonly way to remove phosphorus compound from hot metal resides in the use of converter, more particularly basic oxygen furnace (BOF) converters of various types, such as top blown, bottom blown or combined blown converters.

FIELD OF THE INVENTION

Hot metal can also be dephosphorized in a ladle after the dephosphorization process by oxygen addition into the metal.

Nowadays, in many refining processes, a lime composition containing oxides, such as quicklime and/or dolime and scrap material are introduced into the converter to control the kinetic and the chemistry of the reaction of forming slag, thereby assisting in the removal of impurities and protecting the furnace refractory lining from excessive wear.

The lime composition is charged into the vessel under the form of pebble or even in a powdery state. Quicklime and/or dolime are floating on the hot metal bath thereby forming an interface.

During the refining, molten metal obtained from smelting is fed into the vessel (converter or ladle with refractory walls) wherein scrap material may also be charged.

BACKGROUND OF THE INVENTION

The molten metal from smelting comprises an initial carbon content of typically 40-45 kg/ton of molten metal and an initial phosphorus content of 0.7-1.2 kg/ton of molten metal.

The lime composition is charged and floats upon the molten metal bath. Oxygen is blown for a predetermined period of time, in order, as said previously, to burn carbon, phosphorus compound and silicon. During the blowing, the lime composition is immersed into the molten metal bath and dissolves/smelts slightly at the interface of molten metal and lime composition still floating.

The slag is the layer of oxides floating upon the bath and results from $SiO_2$ formation due to silicon oxidation, other oxides formation ($MnO$ and $FeO$) during the blowing, addition of lime composition to neutralize the $SiO_2$ action on the refractory lining and to liquefy and activate the slag, and $MgO$ coming from the wear of the refractory lining.

In fact, during the conversion, a metal/gas reaction occurs where carbon is burned to form gaseous $CO$ and $CO_2$. At the end of the predetermined duration of blowing, the carbon content is reduced at about 0.5 kg/ton of molten metal, meaning about 500 ppm.

At the interface of molten metal and floating lime composition a metal/slag reaction occurs in order to dephosphorize the molten metal. At the end of the reaction between slag and metal, the phosphorus content is about or below 0.1 kg/ton molten metal, meaning about or below 100 ppm.

If the metal is iron, the chemical reaction is as follows:

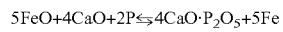

$$5FeO+4CaO+2P \leftrightarrows 4CaO \cdot P_2O_5+5Fe$$

$FeO$ (iron oxide) is originating from the hot metal, while $CaO$ is added in the converter and the phosphorus is originating from the hot metal.

This reaction is exothermic and the aim is to displace the equilibrium to the right side. This can be done by reducing the temperature, fluidizing the slag as much as possible, homogenizing the metal bath (done by blowing of argon and/or nitrogen from the bottom in most of cases), keeping the basicity index $CaO/SiO_2$ between 3 and 6 (weight of calcium oxide ratio to silica being acid), keeping the level of magnesite below 9% into the slag and creating sufficient amounts of slag.

Magnesite is typically present in the slag and is originating from the refractory lining wearing, which can be reduced with controlled addition of dolime. However, to favor the kinetic of the reaction in the slag, the level of magnesite should be kept below 9%.

As it can be understood, refining the hot metal is not so easy and its optimization should be performed for achieving a given liquid metal quantity by acting on the metal mass balance, a given chemical analysis by acting on the oxygen mass balance (oxidation reaction) and a given temperature at the end of the blow (acting on the thermal balance).

The complexity of improving dephosphorization during refining of hot metal is created inter alia due to the simultaneous respect of the three balances.

Such a process for dephosphorization during refining is known in the art from document "Process for dephosphorization of steel in Linz Donawitz converter (BOF converter) by pellet addition" (IN01412MU2006 A).

This patent focusses on the improvement of dephosphorization in the converter-process by cooling the slag in the second half of the process.

However, unfortunately, the disclosed process requires an additional step in the process to charge pellets into the converter after the mineral additives and the standard coolant are charged. This is therefore increasing the process duration, being not an acceptable solution for the refining industry, since each second in such a refining process is very expensive.

Another process for phosphorus removal is known from document Slag-Making Methods And Materials, U.S. Pat. No. 3,771,999. This patent focusses on the improvement of dephosphorization in the converter-process by using briquetted lime-based products having 0.5-15% $CaCl_2$, $NaCl$, $KCl$ and/or $NaF_2$.

Unfortunately, during such process as it happens with the use of pebble lime, the lime composition typically under the form of briquetted or pebble lime generates a loss of up to 20% of burnt lime due to the generation of fines during the transport to the steel shop and due to handling and transport inside the steel shop.

The present invention encounters to solve at least a part of these drawbacks by providing a process allowing to reduce drastically the loss of lime which latter is creating additional costs for the refining industry, where competition is strong and each and every second as well as each and every dollars or euro shall be saved to stay competitive.

To solve this problem, it is provided according to the present invention, a process for refining a molten metal as mentioned in the beginning characterized in that said first lime composition comprises at least one first calcium-magnesium compound fitting the formula

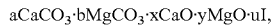
$aCaCO_3 \cdot bMgCO_3 \cdot xCaO \cdot yMgO \cdot uI$, wherein I represents impurities, a, b and u each being mass fractions $\geq 0$ and $\leq 50\%$, x and y each being mass fractions $\geq 0$ and $\leq 100\%$, with $x+y \geq 50\%$ by weight, based on the total weight of said at least one calcium-magnesium compound, said at least one calcium-magnesium compound being in the form of particles, said first lime composition having a cumulative calcium and magnesium content in the form of oxides greater than or equal to 20% by weight based on the total weight of the first lime composition, and being in the form of compacts, each compact being formed with compacted and shaped particles of calcium-magnesium compounds, said compacts having a Shatter Test Index of less than 20%, preferably less than 15% and more preferably less than 10% and in that said dephosphorization step of hot metal leads to a refined metal reduced in phosphorus component to the extent that the refined metal reduced in phosphorus is showing a phosphorus content lower than 0.02 w % based on the total weight of the refined metal reduced in phosphorus.

Advantageously, said refined metal shows a phosphorous content lower than 0.015 w %, preferably lower than 0.012 w %, in particular lower than 0.010 w % based on the total weight of the refined metal reduced in phosphorous.

SUMMARY OF THE INVENTION

According to the present invention, the charging step of hot metal, optionally with scrap is performed before, during or after the charging step of said first lime composition.

As it can be seen, the present invention provides a process where the amount of reduced phosphorus from the molten metal is increased without adding further complexity in the state of the art process, meaning without increasing duration of the process or needing physical transformation of the plant of the refiner while reducing the loss of lime by the use of the compacted first lime composition by 50% due to improved shatter properties.

The substitution of converter grade pebble lime/dolime by shaped calcium-magnesium compound fines that are homogeneously mixed before shaping increases the dephosphorization in the refining process, without the need of changing the existing steelmaking process by additional steps like inblow- or afterblow-addition of materials, prolongation of blowing time or post stirring time nor by increasing the amount of CaO used per ton of steel nor to overoxidize the steel nor lowering the tapping temperature nor changing the blowing schedule or characteristics.

Further, the aforementioned substitution is increasing the contact duration between the lime composition and the slag, thereby favoring the reaction of dephosphorization of the molten metal since the compacted calcium-magnesium compound particles have a longer dissolution/melting time period allowing the undissolved lime available to delay the melting kinetics providing the slag with new "unreacted" lime composition and cool further the slag to enhance the dephosphorization reaction at the end of the process without the need to feed any additional material during or after blowing or to change any other blowing parameters.

The $CaCO_3$, $MgCO_3$, CaO and MgO contents in calcium-magnesium compounds may easily be determined with conventional methods. For example, they may be determined by X fluorescence analysis, the procedure of which is described in the EN 15309 standard, coupled with a measurement of the loss on ignition and a measurement of the $CO_2$ volume according to the EN 459-2:2010 E standard.

The contents of calcium and magnesium in the form of oxides in the composition may also, in the simplest cases, be determined with the same method. In more complicated cases, such as for example compositions containing diverse mineral or organic additives, one skilled in the art will be able to adapt the battery of characterization techniques to be applied for determining these contents of calcium and magnesium in the form of oxides. As an example and in a non-exhaustive way, it is possible to resort to thermogravimetric analysis (TGA) and/or thermodifferential analysis (TDA), optionally performed under an inert atmosphere, or else further to X-ray diffraction analysis (XRD) associated with a semi-quantitative analysis of the Rietvelt type.

Advantageously, said first lime composition comprises one second compound chosen in the group consisting of $B_2O_3$, $NaO_3$, $TiO_2$, calcium aluminate, calcium ferrite such as $Ca_2Fe_2O_5$ or $CaFe_2O_4$, metallic iron, $CaF_2$, C, one or several oxides, such as an oxide based on aluminum, an oxide based on iron, an oxide based on manganese and their mixture.

DETAILED DESCRIPTION OF THE INVENTION

In a particular embodiment, said second compound completely or partly stems from FeO-containing dusts coming from the steelmaking process.

The addition of fluxes like iron oxides, manganese oxides, carbon, $CaF_2$, boron oxide during refining process to lime composition has been shown in the state of the art to improve the quality of the refining process like for the dephosphorization of molten metal. However, the addition of such fluxes is typically creating additional complexity to the refining process.

According to the present invention, it has been made possible to form a compacted first lime composition containing calcium-magnesium compound and such fluxes to further improve the dephosphorization process during refining molten metal.

During the first minutes of the refining process there is not enough slag available in the reaction vessel to efficiently start the dephosphorization reaction in the state-of-the-art process. The use of doped compacted first lime composition with fluxes, which were shown as melting faster than pebble lime, helps to form a liquid slag sooner in the beginning of the process, compared to said state-of-the-art process, due to a homogeneous mixing and shaping of a homogenized mixture that allows to further fasten the slag formation process and to minimize the formation of high melting slag components such as calcium silicates that are usually formed during the aforementioned state-of-the-art process.

In a preferred embodiment of the process according to the present invention, said charging step of said vessel with first lime composition is performed simultaneously or separately with a charging step of said vessel with a second lime composition.

In a preferred embodiment of the process according to the present invention, said second lime composition comprises at least one compound chosen between compound i), compound ii) and/or compound iii), wherein compound i) is calcium-magnesium compound under the form of pebble lime, therefore typically coming from calcination of natural limestone and typically having a cumulative calcium and magnesium content in the form of oxides greater than or equal to 70%, preferably greater than or equal to 80%, more preferably greater than or equal to 90%, in particular greater than or equal to 95% by weight based on the total weight of said calcium-magnesium compound, wherein compound ii) is calcium-magnesium compound fitting the formula

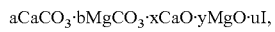
$aCaCO_3 \cdot bMgCO_3 \cdot xCaO \cdot yMgO \cdot uI$, wherein I represents impurities, a, b and u each being mass fractions $\geq 0$ and $\leq 50\%$, x and y each being mass fractions $\geq 0$ and $\leq 100\%$, with $x+y \geq 50\%$ by weight, based on the total weight of said at least one calcium-magnesium compound, said at least one calcium-magnesium compound being in the form of particles, said second lime composition having a cumulative calcium and magnesium content in the form of oxides greater than or equal to 20% by weight based on the total weight of the second lime composition, and being in the form of compacts, each compact being formed with compacted and shaped particles of calcium-magnesium compounds, said compacts having a Shatter Test Index of less than 10%, and wherein compound iii) is a first calcium-magnesium compound fitting the formula

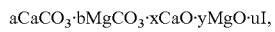
$aCaCO_3 \cdot bMgCO_3 \cdot xCaO \cdot yMgO \cdot uI$, wherein I represents impurities, a, b and u each being mass fractions $\geq 0$ and $\leq 50\%$, x and y each being mass fractions $\geq 0$ and $\leq 100\%$, with $x+y \geq 50\%$ by weight, based on the total weight of said at least one calcium-magnesium compound, said at least one calcium-magnesium compound being in the form of particles, and one second compound chosen in the group consisting of $B_2O_3$, $NaO_3$, $TiO_2$, calcium aluminate, calcium ferrite such as $Ca_2Fe_2O_5$ or $CaFe_2O_4$, metallic iron, $CaF_2$, C, one or several oxides, such as an oxide based on aluminum, an oxide based on iron, an oxide based on manganese and their mixture, said second lime composition having an cumulative calcium and magnesium content in the form of oxides greater than or equal to 20% by weight based on the total weight of the second lime composition, and being in the form of compacts, each compact being formed with compacted and shaped particles of calcium-magnesium compounds, said compacts having a Shatter Test Index of less than 20%, preferably less than 15%, more preferably less than 10%.

In a particular embodiment, said second compound completely or partly stems from FeO-containing dusts coming from the steelmaking process.

By using a mixture of compacted first lime composition and second lime composition having two or more different chemical compositions, sizes or forms it is possible to control the melting kinetics of the converter lime in a way that there is an optimized slag available throughout the whole process without the need to add any lime or other minerals during the process.

In a particular embodiment, the first compacted lime composition (first and/or second lime composition) used in the process according to the present invention may comprise one second compound chosen in the group consisting of $B_2O_3$, $NaO_3$, $TiO_2$, metallic iron, $CaF_2$, C, one or several oxides, such as an oxide based on aluminum, an oxide based on iron, an oxide based on manganese and their mixture, in particular at a content comprised in the range of 1 to 20% by weight, preferably 1 to 15% by weight, in particular 1 to 10% by weight, based on the total weight of the lime composition.

In a second particular embodiment, the second compacted lime composition (first and/or second lime composition) used in the process according to the present invention may comprise one second compound chosen in the group consisting of $B_2O_3$, $NaO_3$, $TiO_2$, metallic iron, $CaF_2$, C, one or several oxides, such as an oxide based on aluminum, an oxide based on iron, an oxide based on manganese and their mixture, in particular at a content comprised in the range of 1 to 20% by weight, preferably 1 to 15% by weight, in particular 1 to 10% by weight, based on the total weight of the lime composition.

The compacted lime composition may also be a mixture of said first compacted lime composition and of said second lime composition (in the form of compacts or not).

In another particular embodiment, the compacted lime composition used in the process according to the present invention may comprise one second compound chosen in the group consisting of calcium aluminate, calcium ferrites, such as $Ca_2Fe_2O_5$ or $CaFe_2O_4$ and their mixture, in particular at a content comprised in the range of 1 to 40% by weight, preferably 1 to 30% by weight, in particular 1 to 20% by weight based on the total weight of the lime composition.

By compacted lime composition or compacts, it is meant fines or mixtures of fines (with a size typically below 7 mm) which are compacted or compressed. These compacts generally appear in the form of tablets or briquettes.

By tablet, in the sense of the present invention is meant objects shaped with a technology for compacting or compressing fines because of the combined action of two punches (one in the high position, the other in the low position) on said fines placed in a cavity. The term of tablet therefore groups together the whole of the shaped objects belonging to the family of tablets, of pastilles or else further of compressed tablets, and generally objects with diverse three dimensional shapes such as a cylindrical, octagonal, cubic or rectangular shapes for example. Said technology generally uses rotary presses or hydraulic presses.

By briquette, in the sense of the present invention is meant objects shaped with a technology for compacting or compressing fines resulting from the combined action of two tangential rollers (generally cylinders provided with cavities forming molds substantially corresponding to the desired shape and dimensions for the briquette) on said fines the supply of which is forced by a worm screw. The term of briquette therefore groups together the whole of the shaped objects belonging to the family of briquettes, balls, soap bars or else further platelets. Said technology generally uses presses with tangential rollers.

By the term of Shatter Test index, in the sense of the present invention, is meant the mass percentage of the fines of less than 10 mm generated after 4 two-meter falls with initially 0.5 kg of product with a size of more than 10 mm.

These 4 falls are achieved by using a tube with a length of 2 m and a diameter of 40 cm with a removable bottom (receptacle). The base of the receptacle is a polypropylene plate with a thickness of 3 mm. The receptacle rests on a concrete ground.

The compacted lime composition used in the process according to the present invention in the form of tablets or briquettes will be distinguished relatively to the pebble lime from calcination of limestone or dolomite rocks, by considering the internal structure. By a simple naked eye observation, with an optical microscope or else with a scanning electron microscope (SEM), the constitutive particles of the compact product from the invention may easily be shown unlike the pebble lime products from calcination which have a homogeneous surface in which the constitutive particles are indiscernible.

Moreover the compacted lime composition used in the process according to the present invention in the form of tablets or briquettes will be distinguished from the products in the form of briquettes and the like known hitherto, by also considering the internal structure. The compacted lime composition used in the process according to the present invention is free from macroscopic defects or macrodefects, which have a negative influence on the resistance to falling, such as clefts or cracks, unlike the products in the form of briquettes and the like, known today, which contain cracks from a few hundred micrometers to a few millimeters in length and from a few micrometers to a few hundred micrometers in width which may easily be detected by simple naked eye observation, under an optical microscope or else under a scanning electron microscope (SEM).

According to the present invention, the compacted lime composition used in the process according to the present invention appears as a compact product highly resistant to falling and to ageing in a humid atmosphere, which is particularly important for subsequent uses where fines cannot be applied. The process according to the invention therefore allows the utilization of fine calcium-magnesium compound particles having a $d_{100}$ of less than or equal to 7 mm in applications of calcium-magnesium compounds, which were banned up to now.

The impurities in the calcium-magnesium compound of the compacted lime composition used in the process according to the present invention notably comprise all those which are encountered in natural limestones and dolomites, such as clays of the silico-aluminate type, silica, impurities based on iron or manganese.

The composition according to the invention may therefore also comprise calcium or magnesium carbonates such as unfired materials from the baking of natural limestones or dolomites or else further products from the recarbonation of calcium-magnesium compounds. Finally it may also comprise calcium or magnesium hydroxides from the hydration (slaking) of calcium-magnesium compounds.

In an alternative of the composition according to the invention, the calcium-magnesium compounds completely or partly stem from the recycling of co-products, notably steel industry slags from converters. Such slags typically have a mass content from 40 to 70% of CaO and from 3 to 15% of MgO.

In an advantageous alternative, said at least one calcium-magnesium compound of the compacted lime composition used in the process according to the present invention has mass fractions such that x+y≥60%, preferably ≥75%, preferentially ≥80%, particularly ≥85%, and even more preferentially ≥90%, more particularly ≥93%, or even ≥95% by weight, based on the total weight of said at least one calcium-magnesium compound.

In this advantageous alternative, said at least one calcium-magnesium compound of the compacted lime composition used in the process according to the present invention is in majority a compound based on calcium and/or magnesium oxide and therefore is an active calcium-magnesium compound.

In a particular advantageous embodiment, said at least one calcium-magnesium compound of the compacted lime composition used in the process according to the present invention has mass fractions such that x≥60%, preferably ≥75%, preferentially ≥80%, particularly ≥85%, and even more preferentially ≥90%, more particularly ≥93%, or even ≥95% by weight, based on the total weight of said at least one calcium-magnesium compound.

In this advantageous embodiment, said at least one calcium-magnesium compound is in majority a compound based on calcium oxide and therefore is an active calcium compound.

In another advantageous embodiment, the compacted lime composition used in the process according to the present invention has a cumulative content of calcium and magnesium in the form of oxides, greater than or equal to 40% by weight, advantageously ≥60% by weight, preferably ≥80% by weight, particularly ≥85% by weight, in particular ≥90% by weight, preferentially ≥93% by weight, or even equal to ≥95% by weight based on the total composition.

In a particular advantageous embodiment, the compacted lime composition used in the process according to the present invention has a cumulative content of calcium in the form of oxides greater than or equal to 40% by weight, advantageously ≥60% by weight, preferably ≥80% by weight, particularly ≥85%, in particular ≥90% by weight, preferentially ≥93% by weight, or even equal to 95% by weight based on the total composition.

Advantageously, said compacted lime composition used in the process according to the present invention under the form of compacts have a Shatter Test Index of less than 8%. More particularly, according to the present invention, said compacts have a Shatter Test Index of less than 6%. More advantageously, said compacts have a Shatter Test Index of less than 4%. And even more advantageously, said compacts have a Shatter Test Index of less than 3%.

Advantageously, the compacted lime composition used in the process according to the present invention has a specific surface area measured by manometry with adsorption of nitrogen after degassing in vacuo at 190° C. for at least 2 hours and calculated according to the multipoint BET method as described in the ISO 9277:2010E standard of more than or equal to 0.4 m²/g, preferably greater than or equal to 0.6 m²/g, more preferentially greater than or equal to 0.8 m²/g and even more preferentially greater than or equal to 1.0 m²/g and in particular greater than or equal to 1.2 m²/g, which is much greater than that of sintered products which generally have a specific surface area of less than or equal to 0.1 m²/g.

In this way, the composition has a relatively high specific area as compared with the sintered briquettes above notably by preserving the intrinsic properties/structural characteristics of the calcium-magnesium compound before its shaping.

Said compacted lime composition used in the process according to the present invention is also characterized in that its total pore volume (determined by porosimetry with intrusion of mercury according to Part 1 of the ISO 15901-1:2005E standard which consists of dividing the difference between the skeleton density measured at 30000 psia, (207 Mpa), and the apparent density, measured at 0.51 psia (3.5 kPa), by the skeleton density) is greater than or equal to 20%, preferably greater than or equal to 25% and even more preferentially greater than or equal to 30%, which is much greater than that of sintered products which generally have a total pore volume of less than or equal to 10%.

Advantageously, the compacted lime composition used in the process according to the present invention has a relatively high total pore volume as compared with the sintered briquettes above, notably by preserving the intrinsic properties/structural characteristics of the calcium-magnesium compound before shaping.

Advantageously, said compacted lime composition used in the process according to the present invention has a homogeneous density distribution within the compact. The compaction method allows formation of compacts where the density is substantially the same along the longitudinal direction and along the transverse direction.

In another embodiment, a low density gradient may exist along the longitudinal direction.

Compacted lime compositions used according to the present invention are exemplified in WO2015/007661 and its counterpart US 2016/0115076, incorporated herein by reference, in paragraphs [0074-0077], wherein a method is described for producing a composition in the form of a compact comprising the following successive steps:

providing a composition of particles comprising at least particles of at least one calcium- magnesium compound fitting the formula

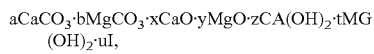
aCaCO$_3$·bMgCO$_3$·xCaO·yMgO·zCA(OH)$_2$·tMG(OH)$_2$·uI, wherein I represents impurities, a, b, z, t and u each being mass fractions ≥0 and ≤50%, x and y each being mass fractions ≥0 and ≤100%, with ≥50% by weight based on the total weight of the calcium-magnesium compound, in a confinement space between two punches having a section comprised between 1 and 40 cm$^2$, advantageously comprised between 1 and 20 cm$^2$, preferably between 1 and 10cm$^2$, in particular between 2 and 10 cm$^2$ [0075] b) compacting said particles for forming a compact product of a three-dimensional shape, by applying a compacting pressure comprised between 200 MPa and 700 MPa, preferably comprised between 250 MPa and 500 MPa, more preferentially between 300 and 500 MPa, and even more preferenday between 375 and 490 MPa, [0076] c) releasing the compaction pressure and [0077] d) collecting said compact product.

According to the present invention, said compacted lime composition used in the process according to the present invention under the form of compacts also have a Shatter Test Index of less than 20%, preferably less than 10% after an Accelerated Ageing Test of level 1 at 30° C. under 75% of relative humidity (i.e. 22.8 g/m$^3$ of absolute humidity) for 2 hours.

By Accelerated Ageing Test, in the sense of the present invention, is meant ageing for 2 hours made in a weather chamber starting with 0.5 kg of product with a size greater than or equal to 10 mm placed as a monolayer on a grid itself placed above a receptacle, so that the contact between the product and the humid atmosphere is optimum, i.e. each of said constitutive compacts of the product is spaced apart from the other compacts by at least 1 cm. The increase in the mass during ageing quantifies the water absorption and therefore the hydration of the composition.

The Shatter Test Index measured after ageing is obtained starting with the totality of the product, i.e. even if the Accelerated Ageing Test has generated by itself fines, they are properly counted in the final result. The Accelerated Ageing Test may be carried out under different temperature and relative humidity conditions—and therefore of absolute humidity—so as to modulate its intensity. Four intensity levels ranging from 1 (the less severe test) to 4 (the most severe test) were used:

Level 1: 30° C. and 75% of relative humidity leading to an absolute humidity of 22.8 g/m$^3$;

Level 2: 40° C. and 50% of relative humidity leading to an absolute humidity of 25.6 g/m$^3$;

Level 3: 40° C. and 60% of relative humidity leading to an absolute humidity of 30.7 g/m$^3$;

Level 4: 40° C. and 70% of relative humidity leading to an absolute humidity of 35.8 g/m$^3$.

Advantageously, said compacted lime composition used in the process according to the present invention under the form of compacts have a Shatter Test Index of less than 20%, preferably less than 10%, after an Accelerated Ageing Test of Level 2 at 40° C. under 50% of relative humidity (i.e. 25.6 g/m$^3$ of absolute humidity) for 2 hours.

More advantageously, said compacted lime composition used in the process according to the present invention under the form of compacts have a Shatter Test Index of less than 20%, preferably less than 10%, after an Accelerated Ageing Test of Level 3 at 40° C. under 60% of relative humidity (i.e. 30.7 g/m$^3$ of absolute humidity) for 2 hours.

Even more advantageously, said compacted lime composition used in the process according to the present invention under the form of compacts have a Shatter Test Index of less than 20%, in particular less than 10%, more particularly, less than 5% and even most particularly less than 3%, after an accelerated ageing test of Level 4 at 40° C. under 70% of relative humidity (i.e. 35.8 g/m$^3$ of absolute humidity) for 2 hours.

According to the present invention, the said compacted lime composition used in the process according to the present invention under the form of compacts may contain organic additives such as for example binders or else further lubricants but it may also be without the presence of these organic additives.

The organic carbon percentage present in the composition according to the invention may be calculated by a difference between the total carbon percentage and the percentage of carbon of mineral origin. Total carbon is for example measured by C/S analysis according to the ASTM C25 (1999) standard and the carbon of mineral origin is determined for example by dosing the CO$_2$ volume according to the EN 459-2:2010 E standard.

In a particular embodiment of the composition according to the invention, said compacted lime composition is thermally treated at between 700° C. and 1200° C. for a predetermined time period comprised between 1 and 90 minutes, preferably greater than or equal to 5 minutes and less than or equal to 60 minutes, more particularly greater than or equal to 10 minutes and less than or equal to 30 minutes.

In a particular embodiment of the composition according to the invention, said particles of the compacted lime composition used in the process according to the present invention have a size of less than or equal to 7 mm, observable by optical microscopy or scanning electron microscopy and before compaction have a particle size d$_{100}$ of less than or equal to 7 mm, in particular less than or equal to 5 mm, as for example measured by sieving.

The grain size distribution of the pebble lime varies due to varying limestone properties. This variation is eliminated and can be controlled to have defined melting kinetics of the product due to the shaping of the product.

According to the present invention, the compacted lime composition used in the process according to the present invention therefore appears as compacts which are initially obtained starting with fine composites of particles of calcium-magnesium compounds having a $d_{100}$ of less than or equal to 7 mm and which are finally highly resistant to falling and to ageing in a humid atmosphere, which is particularly of importance for subsequent uses where the fines cannot be applied. The composition according to the invention therefore allows inter alia, as noted above, the utilization of fine particles of calcium-magnesium compounds having a $d_{100}$ of less than or equal to 7 mm, in applications of calcium-magnesium compounds which were banned up to now.

The notation $d_x$ represents a diameter expressed in mm, relatively to which X% by mass of the measured particles are smaller or equal.

In a particular advantageous embodiment of the invention, said particles of calcium-magnesium compounds of compacted lime composition used in the process according to the present invention have a $d_{90}$ before compaction of less than or equal to 3 mm, in particular less than or equal to 2 mm.

More particularly, said particles of calcium-magnesium compounds of the compacted lime composition used in the process according to the present invention before compaction have a $d_{50}$ of less than or equal to 1 mm, in particular less than or equal to 500 μm, and a $d_{50}$ greater than or equal to 0.1 μm, in particular greater than or equal to 0.5 μm, in particular greater than or equal to 1 μm.

According to another advantageous embodiment of the present invention, said compacted lime composition used in the process according to the present invention under the form of compacts are of a regular and homogeneous shape, typical of products from methods for shaping fines via a dry route, for example selected from the group of tablets or briquettes, and have a size comprised between 10 and 100 mm, preferably greater than or equal to 15 mm, preferably greater than or equal to 20 mm, and preferably less than or equal to 70 mm, in particular less than or equal to 50 mm.

By size of the compacts is meant that of those which cross through a sieve or screen, for example with square meshes.

More particularly, in the sense of the present invention, said compacted lime composition used in the process according to the present invention under the form of compacts have an average weight per compact of at least 1 g, preferably of at least 5 g, preferentially of at least 10 g and in particular of at least 15 g.

In a preferred embodiment of the present invention, said compacted lime composition used in the process according to the present invention under the form of compacts have an average weight per compact of less than or equal to 200 g, preferably less than or equal to 150 g, preferentially less than or equal to 100 g and in particular less than or equal to 50 g.

Advantageously, said compacted lime composition used in the process according to the present invention under the form of compacts have an apparent density (volume mass) comprised between 1.5 g/cm$^3$ and 3 g/cm$^3$, advantageously between 1.5 g/cm$^3$ and 2.8 g/cm$^3$ and preferably between 1.7 g/cm$^3$ and 2.6 g/cm$^3$.

In an advantageous embodiment of the invention, said compacted lime composition used in the process according to the present invention under the form of compacts includes a through-orifice.

In a preferred embodiment of the invention, the compact appears as a tablet.

The shape of these compact products is easily distinguished from that of pebble calcium-magnesium compounds traditionally obtained after calcination of rock limestone or dolime.

Other embodiments of the process according to the present invention are mentioned in the appended claims.

The present invention also relates to a use of the first and/or second lime composition in the dephosphorization of molten metal during a refining process.

Other characteristics and advantages of the present invention will be derived from the non-limitative following description, and by making reference to the drawings and the examples.

EXAMPLES

Comparative Example 1

A 6 tons universal converter was configured as standard BOF with one bottom tuyere and a water cooled oxygen lance with one oxygen nozzle was used.

The nozzle was positioned 160 cm above bath level from 0-50 Nm$^3$, 150 cm above bath level from 51-100 Nm$^3$ and 140 cm above bath level from 101 Nm$^3$ until the end of blow. The flow rate was 17.0 Nm$^3$/minute oxygen.

The flow rate of the bottom tuyere was kept constant at 433 Ndm$^3$/minute nitrogen.

The converter was charged with 615 kg scrap material (Analysis: 1.14 w % manganese, 0.25 w % carbon, 0.26 w % silicon, 0.023 w % phosphorus, 0.24 w % copper, 0.17 w % nickel, 0.22 w % chromium, 97.5 w % iron, 0.014 w % sulfur, 0.04 w % titanium, 0.01 w % vanadium and 0.052 w % molybdenum with respect to the total weight of the scrap material), and with 174 kg pebble lime 10-50 mm (95 w % CaO, 1 w % MgO, 0.2 w % Al$_2$O$_3$, 0.7 w % SiO$_2$, 0.3 w % Fe$_2$O$_3$, 0.2 w % SO$_3$, 0.01 w % P$_2$O$_5$ with respect to the total weight of pebble lime) and 4970 kg of hot-metal (Analysis: 3.52 w % carbon, 0.024 w % sulfur, 0.25 w % silicon, 0.53 w % manganese and 0.078 w %=780 ppm phosphorus with respect to the total weight of the hot metal). 232 Nm$^3$ oxygen were blown onto this mixture in 14 minutes with constant bottom stirring.

The blowing of oxygen was controlled by off-gas analysis. The blowing-process was stopped when the CO$_2$-content of the waste-gas dropped below 4 vol % compared to the total volume of waste gas.

After obtaining the "after blow" slag- and steel-sample in tilted position after end of blow, the converter was raised again for post-stirring with 433 Ndm$^3$/minute nitrogen for five minutes.

The converter was tilted again, the "after stirring" slag- and steel-samples were obtained.

The phosphorus content of the steel-sample after stirring was 0.020 w % (200 ppm) with respect to the total weight of the steel sample at 1646° C. steel temperature.

Comparative Example 2

Heat was processed under the same operating conditions as in the comparative example 1. The converter described above was charged with 621 kg scrap with the same chemical composition as in comparative example 1, 174 kg of pebble lime 10-50 mm with the same chemical composition as in comparative example 1 and 4950 kg of hot-metal (Analysis: 3.70 w % carbon, 0.017 w % sulfur, 0.37 w % silicon, 0.47 w % manganese and 0.078 w % phosphorus with respect to the total weight of the hot metal). 241 Nm³ oxygen were blown onto the metal bath in 14 minutes.

The oxygen flow rate was 17.0 Nm³/min and the same lance program was used as in comparative example 1.

The blowing of oxygen was controlled by off-gas analysis. The blowing-process was stopped when the $CO_2$-content of the waste-gas dropped below 4 vol % with respect to the total volume of waste gas.

After obtaining the "after blow" slag- and steel-samples in tilted position after end of blow, the converter was raised again for post-stirring with 433 Ndm³/minute nitrogen for four minutes.

The converter was tilted again, the "after stirring" slag- and steel-samples were obtained.

The phosphorus content of the steel-sample after stirring was 0.020 w % with respect to the total weight of the steel sample (200 ppm) at 1646° C. steel temperature.

Example 1

The converter according to comparative example 1 was charged with 508 kg scrap material (Analysis: 1.14 w % manganese, 0.25 w % carbon, 0.26 w % silicon, 0.023 w % phosphorus, 0.24 w % copper, 0.17 w % nickel, 0.22 w % chromium, 97.5 w % iron, 0.014 w % sulfur, 0.04 w % titanium, 0.01 w % vanadium and 0.052 w % molybdenum with respect to the total weight of the scrap material), and 174 kg of a first lime composition comprising fines lime particles compacted together and showing a shatter test of 2.8%, presenting a diameter of 21 mm and an average thickness of 15 mm and having the same chemical composition than the pebble lime mentioned above and 4900 kg of hot-metal (Analysis: 3.74 w % carbon, 0.015 w % sulfur, 0.36 w % silicon, 0.32 w % manganese and 0.075 w % phosphorus with respect to the total weight of the hot metal).

227 Nm³ oxygen were blown onto this mixture in 14 minutes with constant bottom stirring.

The blowing of oxygen was controlled by off-gas analysis. The blowing-process was stopped when the $CO_2$-content of the waste-gas dropped below 4 vol % with respect to the total volume of waste gas.

After obtaining the "after blow" slag- and steel-samples in tilted position after end of blow, the converter was raised again for post-stirring with 433 Ndm³/minute nitrogen for five minutes.

The converter was tilted again, the "after stirring" slag- and steel-samples were obtained.

The phosphorus content of the steel-sample after stirring was 0.014 w % based on the total weight of the steel sample (140 ppm) at 1662° C. steel temperature.

Example 2

The converter described in the references was charged with 700 kg scrap material with the same chemical composition as in comparative example 1, a mixture of 58 kg of a first lime composition made from compacted lime particles with the same composition as in example 1 and 117 kg pebble lime as in comparative example 1 and 4950 kg of hot-metal (Analysis: 3.72 w % carbon, 0.015 w % sulfur, 0.28 w % silicon, 0.38 w % manganese and 0.075 w % phosphorus based on the total weight of the hot metal). 255 Nm³ oxygen were blown onto the metal bath in 15 minutes. The oxygen flow rate was 17.0 Nm³/min and the same lance program was used as in comparative example 1.

The blowing of oxygen was controlled by off-gas analysis. The blowing-process was stopped when the $CO_2$-content of the waste-gas dropped below 4 vol % with respect to the total volume of waste gas.

After obtaining the "after blow" slag- and steel-sample in tilted position after end of blow, the converter was raised again for post-stirring with 509 Ndm³/minute nitrogen for six minutes.

The converter was tilted again, the "after stirring" slag- and steel-samples were obtained.

The phosphorus content of the steel-sample after stirring was 0.014 w % based on the total weight of the steel sample (140 ppm) at 1680° C. steel temperature.

The mixture of 33% compacted lime composition as in example 1 and 66% pebble lime as in comparative examples 1 and 2 shows the same improvement as example 1.

Example 3

The converter described in the references was charged with 700 kg scrap material with the same chemical composition as in comparative example 1, a mixture of 87 kg of the first lime composition made from compacted fine lime particles as mentioned in example 1 and 97 kg of a second lime composition comprising lime particles and iron oxide compacted together and thermally treated at 1100° C. leading to a conversion of 80% of the iron oxide into calcium ferrite (mostly in the form of $Ca_2Fe_2O_5$) and showing a shatter test of 1.0% and presenting a diameter of 21 mm and a thickness of 15 mm respectively (85 w % CaO, 1 w % MgO, 0.2 w % $Al_2O_3$, 0.7 w % $SiO_2$, 10.5 w % $Fe_2O_3$, 0.2 w % $SO_3$, 0.01 w % $P_2O_5$ based on the total weight of the second lime composition) and 4930 kg of hot-metal (Analysis: 3.70 w % carbon, 0.016 w % sulfur, 0.23 w % silicon, 0.340 w % manganese and 0.076 w % phosphorus based on the total weight of the hot metal). 250 Nm3 oxygen were blown onto the metal bath in 15 minutes.

The oxygen flow rate was 17.0 Nm min and the same lance program was used as described in the references.

The blowing of oxygen was controlled by off-gas analysis. The blowing-process was stopped when the $CO_2$-content of the waste-gas dropped below 4 vol % with respect to the total volume of waste gas.

After obtaining the "after blow" slag- and steel-samples in tilted position after end of blow, the converter was raised again for post-stirring with 519 Ndm³/min nitrogen for four minutes.

The converter was tilted again, the "after stirring" slag- and steel-samples were obtained.

The phosphorus content of the steel-sample after stirring was 0.014 w % based on the total weight of the steel sample (140 ppm) at 1672° C. steel temperature.

The mixture of 50% first lime composition (without fluxes) and 50% second lime composition doped with iron oxide and thermally treated shows the same improvement as example 1 and 2. The presence of iron doped second lime composition allows forming slag earlier in the process. The process behavior was improved in a way that the process was less noisy and that less sculling occurred during the process compared to comparative examples 1 and 2.

Example 4

The converter as in comparative example 1 was charged with 573 kg scrap material with the same chemical composition as in comparative example 1, 202 kg a first lime composition made from quicklime particles doped with manganese oxide and iron oxide compacted together and showing a shatter test of 2.9% presenting a diameter of 21 mm and a thickness of 15 mm respectively (82 w % CaO, 1 w % MgO, 0.2 w % $Al_2O_3$, 0.7 w % $SiO_2$, 10.0 w % $Fe_2O_3$, 2.0 w % MnO, 0.2 w % $SO_3$, 0.01 w % $P_2O_5$ based on the total weight of the first lime composition) and 4960 kg of hot-metal (Analysis: 3.60 w % carbon, 0.011 w % sulfur, 0.46 w % silicon, 0.45 w % manganese and 0.076 w % phosphorus with respect to the total weight of the hot metal). After four minutes of blowing, 20 kg the first lime composition doped with iron oxide and manganese oxide were added into the converter to compensate the high silicon-content of the hot-metal. 251 $Nm^3$ oxygen were blown onto the metal bath in 15 minutes.

The oxygen flow rate was 17.0 $Nm^3$/min and the same lance program was as in comparative example 1.

The blowing of oxygen was controlled by off-gas analysis. The blowing-process was stopped when the $CO_2$-content of the waste-gas dropped below 4 vol % with respect to the total volume of waste gas.

After obtaining the "after blow" slag- and steel-samples in tilted position after end of blow, the converter was raised again for post-stirring with 520 $Ndm^3$/minute nitrogen for seven minutes.

The converter was tilted again, the "after stirring" slag- and steel-samples were obtained.

The phosphorus content of the steel-sample after stirring was 0.014 w % based on the total weight of the steel sample (140 ppm) at 1678° C. steel temperature.

The use of Fe-Mn-doped lime composition of compacted particles shows the same improvement as example 1 to 3.

The process behavior was improved in a way that the process was less noisy and that less sculling occurred during the process compared to comparative examples 1 and 2.

Example 5

The converter as in comparative example 1 was charged with 520 kg scrap material with the same chemical composition as in comparative example 1, 195 kg of the second lime composition used in example 3 and 4980 kg of hot-metal (Analysis: 3.74 w % carbon, 0.014 w % sulfur, 0.38 w % silicon, 0.44 w % manganese and 0.074 w % phosphorus with respect to the total weight of the hot metal). 258 $Nm^3$ oxygen were blown onto the metal bath in 15 minutes. The oxygen flow rate was 17.0 $Nm^3$/min and the same lance program was used as described in the reference.

The blowing of oxygen was controlled by off-gas analysis. The blowing-process was stopped when the $CO_2$-content of the waste-gas dropped below 4 vol % with respect to the total volume of waste gas.

After obtaining the "after blow" slag- and steel-samples in tilted position after end of blow, the converter was raised again for post-stirring with 292 $Ndm^3$/minute nitrogen for seven minutes.

The converter was tilted again, the "after stirring" slag- and steel-samples were obtained.

The phosphorus content of the steel-sample after stirring was 0.015 w % based on the total weight of the steel sample (150 ppm) at 1681° C. steel temperature.

The use of compacted lime particles doped with iron oxide and thermally treated under the form of a compacted first lime composition shows the same improvement as example 1 to 4.

Example 6

The converter as in comparative example 1 was charged similarly as in example 5 except that this time the lime composition comprising a compacted mixture of lime particles and iron oxide was not thermally treated and showed a shatter test of 2.5%. Such approach offers a performance similar than in example 4.

It will be understood by the man skilled in the art that the results according to the present invention have been obtained in a pilot scale and cannot be compared with industrial processes where particular optimization has already been developed. What can be deduced from those examples is that the compact lime composition used in the process according to the invention allows reducing the final phosphorous content in the steel from 200 ppm (references) to 150-140 ppm (examples 1 to 6). In other words, the present invention allows a 30% reduction of the final phosphorous content in the steel which is quite outstanding.

Moreover, the results of examples 1 to 6 have been obtained at higher temperatures (1660-1680° C.) than the references (1646° C.). The person skilled in the art knows that it is harder to dephosphorize at higher temperature. Thus, for a same steel temperature, the improvement in the dephosphorization process obtained with the compacts of the invention, compared to the pebble lime reference, would be even higher than 30%. Therefore the examples according to the present have been performed in the worst case scenario but however still offer good results.

It should be understood that the present invention is not limited to the described embodiments and that variations can be applied without going outside of the scope of the appended claims.

For example, one can contemplate of course to add the compacts according to the present invention to conventional products used already in steel making such a sintered briquettes.

Alternatively, the compacts according to the present invention can also be used in a so-called "two-slag-process". Such method consists of applying a second consecutive dephosphorization process to the refined metal in order to further reduce the phosphorus content. In this case, additional steps of removing the slag from the refined metal, followed by a second charging of the first lime composition, are performed before the discharging of the refined metal reduced in phosphorous components. The compacts of the present invention allow reducing drastically the time needed to perform such kind of process, due to an optimized slag formation.

The invention claimed is:

1. Process for dephosphorization of molten metal during a refining process comprising the steps of
charging a vessel with hot metal and optionally scrap
charging said vessel with a first lime composition
blowing oxygen into said vessel
forming slag with said first lime composition charged into said vessel
dephosphorization of hot metal to form a refined metal reduced in phosphorus components, and
discharging said refined metal reduced in phosphorus components characterized in that said first lime composition comprises at least one first calcium-magnesium compound fitting the formula

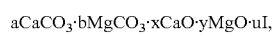

wherein I represents impurities, a, b and u each being mass fractions ≥0 and ≤50%, x and y each being mass fractions ≥0 and ≤100%, with x+y≥50% by weight, based on the total weight of said at least one calcium-magnesium compound, said at least one calcium-magnesium compound being in the form of particles, said first lime composition having a cumulative calcium and magnesium content in the form of oxides greater than or equal to 20% by weight based on the total weight of the first lime composition, and being in the form of compacts, each compact being formed with compacted and shaped particles of calcium-magnesium compounds which are shaped and compacted under compacting pressures between 200 and 700 MPa, said compacts having a Shatter Test Index of less than 20%, and in that said dephosphorization step of molten metal with said compacts increases contact duration between the lime composition and the slat, which action leads to a refined metal reduced in phosphorus component to the extent that the refined metal reduced in phosphorus is showing a phosphorus content lower than 0.02 w % based on the total weight of the refined metal reduced in phosphorus.

2. Process for dephosphorization of molten metal during a refining process according to claim 1, wherein said first lime composition comprises one second compound selected from the group consisting of $B_2O_3$, $TIO_2$, calcium aluminate, calcium ferrite, $Ca_2Fe_2O_5$, $CaFe_2O_4$, metallic iron, C, and one of several oxides based on aluminum, iron, or manganese and mixture thereof.

3. Process for dephosphorization of molten metal during a refining process according to claim 1, wherein said charging step of said vessel with first lime composition is performed simultaneously or separately with a charging step of said vessel with a second lime composition.

4. Process for dephosphorization of molten metal during a refining process according to claim 3, wherein said second lime composition comprises at least one compound selected from the group consisting of compound i), compound ii) and/or compound iii):

i) calcium-magnesium compound under the form of pebble lime having a cumulative calcium and magnesium content in the form of oxides greater than or equal to 70% by weight based on the total weight of said calcium-magnesium compound, ii) calcium-magnesium compound fitting the formula

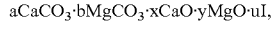
$aCaCO_3 \cdot bMgCO_3 \cdot xCaO \cdot yMgO \cdot uI$, wherein I represents impurities, a, b and u each being mass fractions ≥0 and ≤50%, x and y each being mass fractions ≥0 and ≤100%, with x+y≥50% by weight, based on the total weight of said at least one calcium-magnesium compound, said at least one calcium-magnesium compound being in the form of particles, said second lime composition having a cumulative calcium and magnesium content in the form of oxides greater than or equal to 20% by weight based on the total weight of the second lime composition, and being in the form of compacts, each compact being formed with compacted and shaped particles of calcium-magnesium compounds, said compacts having a Shatter Test Index of less than 10%, and iii) a first calcium-magnesium compound fitting the formula

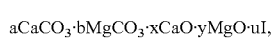
$aCaCO_3 \cdot bMgCO_3 \cdot xCaO \cdot yMgO \cdot uI$, wherein I represents impurities, a, b and u each being mass fractions ≥0 and ≤50%, x and y each being mass fractions ≥0 and 100%, with x+y≥50% by weight, based on the total weight of said at least one calcium-magnesium compound, said at least one calcium-magnesium compound being in the form of particles, and one second compound chosen in the group consisting of $B_2O_3$, $TiO_2$, calcium aluminate, calcium ferrite, $Ca_2Fe_2O_5$, $Ca_2Fe_2O_4$, metallic iron, C, and one or more oxides based on aluminum, iron, or manganese and mixtures thereof, said second lime composition having an cumulative calcium and magnesium content in the form of oxides greater than or equal to 20% by weight based on the total weight of the second lime composition, and being in the form of compacts, each compact being formed with compacted and shaped particles of calcium-magnesium compounds, said compacts having a Shatter Test Index of less than 20%.

5. Process for dephosphorization of molten metal during a refining process according to claim 1, wherein said refined metal reduced in phosphorus is showing a phosphorus content lower than 0.015 w% based on the total weight of the refined metal reduced in phosphorus.

6. Process for dephosphorization of molten metal during a refining process according to claim 1, wherein said compacts of said first lime composition under the form of compacts have a Shatter Test Index of less than 8%.

7. Process for dephosphorizaion of molten metal during a refining process according to claim 1, wherein said compacts of said first lime composition under the form of compacts presents a Shatter Test Index of less than 20% after an Accelerated Ageing Test of Level 1 at 30° C. under 75% of relative humidity for 2 h.

8. Process for dephosphorization of molten metal during a refining process according to claim 1, wherein said compacts of said first lime composition under the form of compacts presents a Shatter Test Index of less than 20% after an Accelerated Ageing Test of Level 2 at 40° C. under 50% of relative humidity for 2 h.

9. Process for dephosphorization of molten metal during a refining process according to claim 1, wherein said compacts of said first lime composition under the form of compacts presents a Shatter Test Index of less than 20% after an Accelerated Ageing Test of Level 3 at 40° C under 60% of relative humidity for 2 h.

10. Process for dephosphorization of molten metal during a refining process according to claim 1, wherein said compacts of said first lime composition under the form of compacts presents a Shatter Test Index of less than 20% after an Accelerated Ageing Test of Level 4 at 40° C under 70% of relative humidity for 2 h.

11. Process for dephosphorization of molten metal during a refining process according to claim 1, wherein said particles have a size of less than or equal to 7 mm, observable by optical microscopy or by scanning electron microscopy and before compaction having a size of particles $d_{100}$ of less than or equal to 7 mm.

12. Process tor dephosphorization of molten metal during a refining process according to claim 1, wherein said particles of said at least one calcium-magnesium compound before compaction have a $d_{90}$ of less than or equal to 3 mm.

13. Process for dephosphorization of molten metal during a refining process according to claim 1, wherein said particles of said at least one calcium-magnesium compound before compaction have a $d_{50}$ of less than or equal to 1 mm.

14. Process for dephosphorization of molten metal during a refining process according to claim 1, wherein said compacts are of a regular and homogeneous shape such shapes being selected from the group consisting of lozenges, tablets, compressed tablets, briquettes, platelets and balls and have a size comprised between 10 and 100 mm.

15. Process for dephosphorization of molten metal during a refining process according to claim 1, wherein said compacts have an average weight per compact of at least 1 g.

16. Process for dephosphorization of molten metal during a refining process according to claim 1, wherein said compacts have an average weight per compact of less than or equal to 200 g.

17. Process for dephosphorization of molten metal during a refining process according to claim 1, wherein said compacts have an apparent density comprised between 1.5 g/cm$^3$ and 3 g/cm$^3$.

* * * * *